March 21, 1950     J. M. PESTARINI     2,501,477
ELECTRICAL POWER TRANSMISSION SYSTEM
Filed Feb. 25, 1948     2 Sheets-Sheet 1
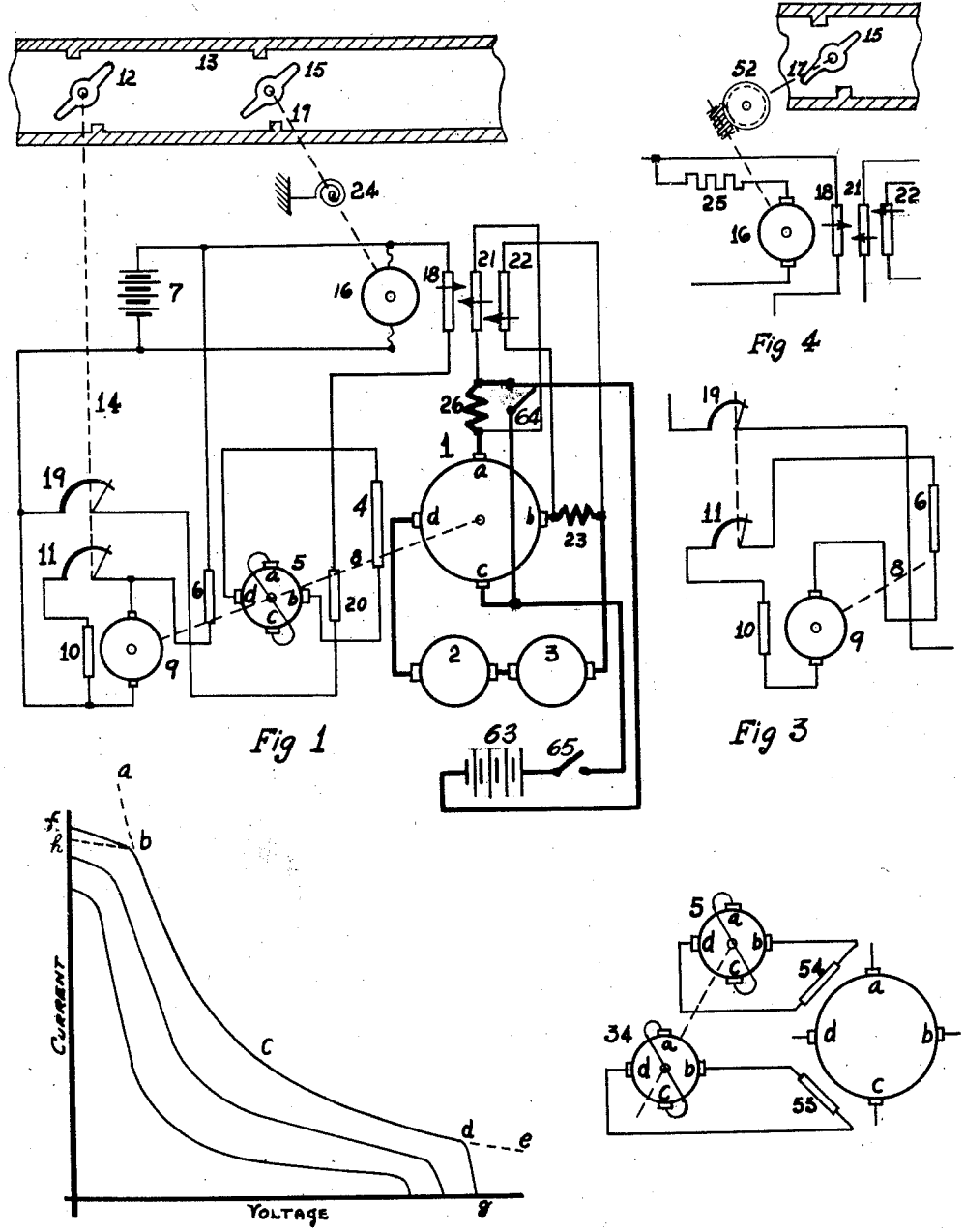
INVENTOR.
BY Joseph Maximus Pestarini March 21, 1950 J. M. PESTARINI 2,501,477
ELECTRICAL POWER TRANSMISSION SYSTEM
Filed Feb. 25, 1948 2 Sheets-Sheet 2
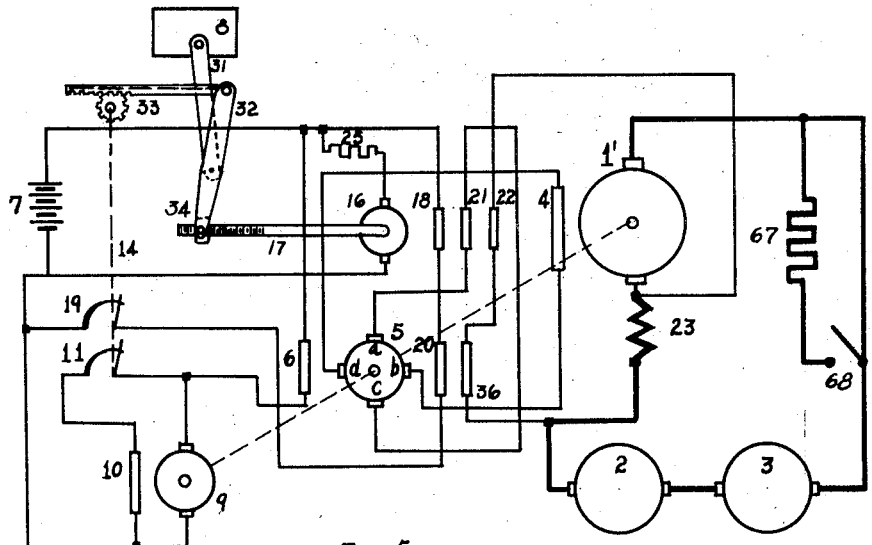
Fig 5
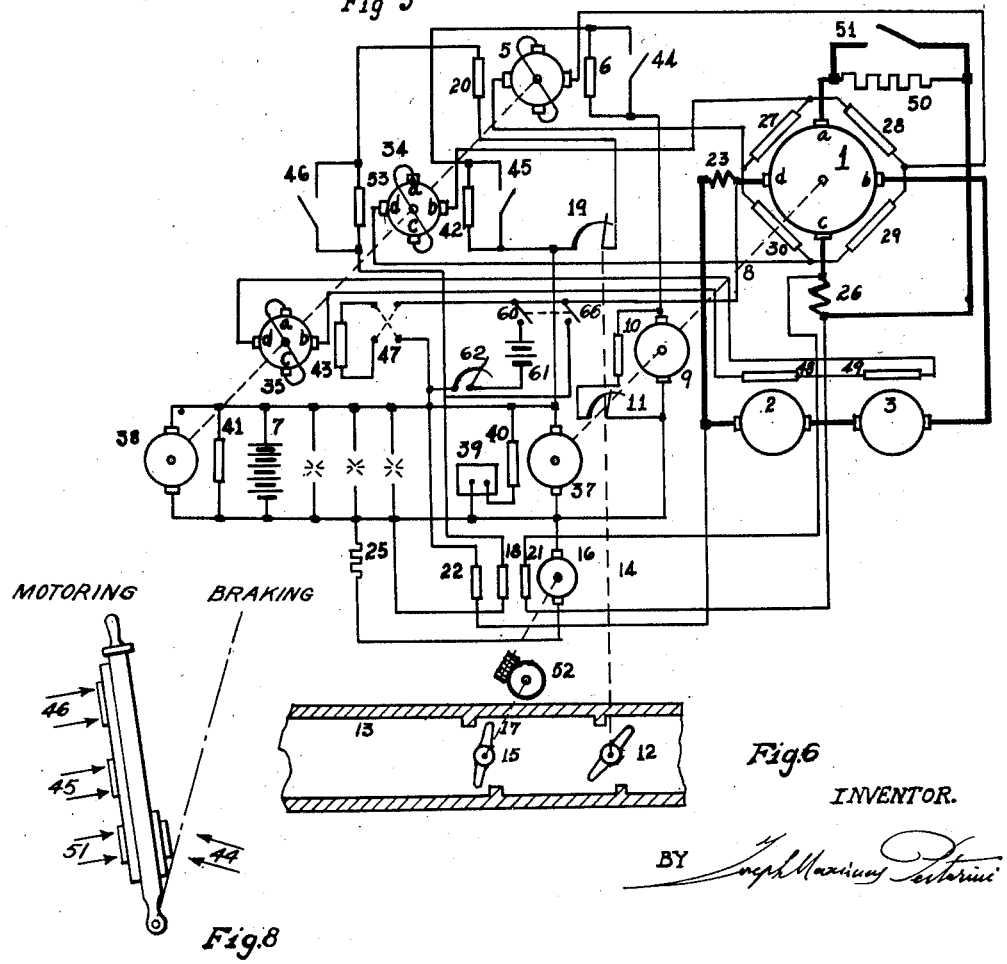
Fig.6
Fig.8
INVENTOR.
BY Joseph Maximus Pestarini Patented Mar. 21, 1950

2,501,477

UNITED STATES PATENT OFFICE 2,501,477

ELECTRICAL POWER TRANSMISSION SYSTEM

Joseph Maximus Pestarini, Staten Island, N. Y.

Application February 25, 1948, Serial No. 10,727
In Great Britain November 11, 1946

18 Claims. (Cl. 290—17)

This invention relates to electrical power transmission systems of the kind in which a load is driven by one or more electric motors supplied from an electric generator which is in turn driven mechanically by a source of power which may be of any suitable kind; the invention is notably, though not exclusively, applicable to such systems where said source of mechanical power comprises a Diesel or other internal combustion engine or a steam engine. Equipments of this kind are for example employed for traction purposes.

The invention has for its object to provide advantageous control arrangements in power systems for the kind above referred to whereby the source of power, hereinafter and in the appended claims referred to for convenience as the engine, is maintained automatically in operation at a desired speed and at constant or substantially constant power output over the major part of the operating speed range of the electric motor or motors.

According to the present invention, control means in a power system of the kind referred to comprise in combination with speed regulating means for maintaining the generator and source of power therefor in operation at a substantially constant speed by adjusting automatically the output of the generator in opposite sense to departures of said speed from the desired value, means responsive to the output current, or both current and voltage, of the generator arranged to reduce the power input to the engine in response to said current exceeding a predetermined value, or to both said current and said voltage exceeding predetermined values respectively. The control of the generator voltage in accordance with the departure of the speed thereof from the desired value will maintain constant power output of the engine since with a constant throttle opening or setting of fuel injection or the equivalent constancy of power supplied to the engine the product of the engine torque and speed will be maintained at a substantially constant value, the motor armature current being varied automatically in substantially inverse relation to the motor armature voltage with varying speed of the latter; such arangements have heretofore been employed in Diesel electric traction equipments. It is however necessary to provide means whereby at low motor speeds the generator current shall not be increased to the values maintaining constant power, since said current would then reach prohibitive values, and similarly it is usually desirable, and in most cases necessary, to reduce the power output of the generator at high motor speeds in order that, with the reduced motor current, the generated voltage shall not reach prohibitive values. It will be seen that the present invention provides simple means whereby the equipment will normally operate at substantially constant power but in which the maximum generator and also the maximum voltage of the generator, if desired, will be limited to suitable values.

In carrying out the invention there is no necessity to provide a centrifugal or other mechanical means responsive to the engine speed for limiting the latter when the power output of the generator is reduced, as is required in the systems heretofore proposed, wherein the limitation of generator voltage and current was produced by control of the generator excitation, although said mechanical means may be employed in systems according to the invention as a safety measure.

Preferably, in carrying out the invention, the speed responsive means operative to maintain constant power output of the generator are of the otherwise known kind comprising a critically excited generator having its armature coupled with the main generator and engine and arranged to supply a controlling field winding on said generator or an exciter therefor, preferably in opposition to a source of constant voltage. Equivalently other arrangements of generator producing a voltage proportional or otherwise varying with the speed of the generator and engine may be employed, controlling the generator excitation in a similar manner.

In carrying out the invention the current responsive means for reducing the power input to the engine may conveniently comprise a torque motor of the moving coil type having one operating element connected for energisation in accordance with the algebraic sum of two components, one of which is a constant or adjustable component and the other of which components acts in opposition to said first component and is dependent upon or representative of the current supplied by the generator to the motor or motors. For obtaining limitation of generator voltage as hereinbefore set forth, said element of the torque motor may be provided with a third control component on the second element thereof dependent upon or representative of the voltage supplied by the generator to the motor or motors and acting in opposition to the constant or adjustable component.

The moving coil torque motor may be arranged in the case of a throttle-controlled internal combustion or steam engine to operate a throttle separate from a main throttle by which the operation of the equipment is normally controlled, that is to say the second mentioned throttle would be operated by the driver in the case of a locomotive, to determine the power applied to the vehicle. Equivalently a single throttle may be operated differentially in accordance with the displacement of a hand lever or the like and said moving coil device. Arrangements of the latter kind are convenient in the case of engines such as Diesel engines controlled by fuel injection.

Preferably the power output of the engine is adjustable by simultaneous movement of the setting of the speed responsive means and the energy input to the engine, an adjusting member of said speed responsive means and a throttle, injection pump control member, or equivalent member being mechanically coupled together.

According to another feature of the invention, where the generator in a power transmission system of the kind referred to is a metadyne machine, in order to provide for rheostatic braking of the motor or motors, means are provided for inserting resistance in the primary circuit of the said metadyne and controlling the motor or motors and metadyne for causing said motor or motors to act regeneratively, supplying current through the metadyne acting as a transformer to said resistance, so that the metadyne operates as a transformer transferring the electrical energy generated in the motor or motors to said resistance for dissipation by the latter.

Duing such rheostatic braking the metadyne machine and engine may be maintained at the desired speed by the same speed responsive means as regulate the engine speed during motoring, that is to say means for maintaining the generator in operation at the desired speed during motoring operation by controlling the secondary variator excitation of the metadyne to increase or reduce the secondary current of the latter according as the speed thereof rises above or falls below the desired value, have associated therewith switching means for transferring the output of said speed responsive means from the secondary axis to the primary axis of the metadyne during rheostatic braking and means are provided for controlling the secondary to determine the armature current of the motor or motors. Conveniently the metadyne generator is provided with control means for motoring operation of the motor or motors as hereinbefore set forth.

The invention comprises also a number of subsidiary features of the invention as are set forth in the appended claims; specific embodiments of these features are described with reference to the accompanying drawings and modifications of these embodiments within the scope of said claims will occur to those skilled in the art.

Reference will now be made by way of example to the accompanying drawings, in which:

Figure 1 is an electrical diagram showing one arrangement according to the invention; Figure 2 is a set of curves with reference to which the operation of equipments according to the invention will be described; Figures 3 and 4 are electrical diagrams showing respectively two modifications of parts of the equipment of Figure 1; Figure 5 is an electrical diagram illustrating an alternative application of the system according to Figures 1, 3 or 4; Figure 6 is an electrical diagram illustrating a preferred embodiment of the invention; Figure 7 is an electrical diagram indicating a modification of part of the system of Figure 6; Figure 8 shows a detail of the system of Figure 5.

Referring first to Figure 1, the invention is shown therein as applied by way of example to a locomotive the generator 1 of which is a metadyne machine having primary brushes $a$ and $c$ connected in a closed circuit and having secondary brushes $b$ and $d$ connected with one or more traction motors, such as the motors 2 and 3.

The metadyne generator is controlled by a secondary variator winding 4 which is connected with the secondary brushes of an exciter 5 in the form of a metadyne generator having short circuited primary brushes. Conveniently, as illustrated, the exciter 5 may form part of the same machine set as the main generator 1 and the prime mover (not shown). The metadyne exciter is provided with a secondary variator winding 6 which is connected with any suitable constant voltage auxiliary source, a battery 7, of current and the armature 9 of a small shunt excited generator, which will be termed the regulator dynamo, the armature of this regulator dynamo being coupled with the main metadyne 1. The shunt field winding of the regulator dynamo is indicated at 10, being connected across the armature of said dynamo in series with a rheostat 11. The regulator dynamo produces an armature voltage acting in opposition to the constant voltage supplied by the battery 7, and is arranged so as to be critically excited at the desired speed of operation of the main generator 1 and the engine, this critical speed being adjustable by the rheostat 11.

The engine is controlled by a manually operable throttle or the like as indicated diagrammatically at 12 in an induction tract 13. The throttle 12 is linked mechanically with the rheostat 11 as shown diagrammatically by the shaft 14 and the arrangement is such that opening the throttle will increase the resistance of the rheostat 11 and so increase the critical speed of the regulator dynamo 9 with the result that the torque of the engine and the regulated speed of the engine are simultaneously controllable by manual operation. It will be appreciated that the regulator dynamo 9 operates in the manner hereinbefore described to increase or reduce the secondary current of the main metadyne machine 1 with departure of the engine speed from the desired value as determined by the adjustment of the rheostat 11 and so to tend to maintain constant power output of the engine for any given position of the shaft 14.

According to the embodiment of the invention shown in Figure 1, the engine is provided with a second throttle 15 or equivalent fuel input control member, and this throttle or the equivalent is coupled with the movable member 16 of a torque motor of the moving coil type. Conveniently this movable member is the armature of the torque motor and may be of a simple form having diametrically opposite tapping points of an armature winding thereof connected with the constant voltage source 7 through flexible leads. The connection of the armature 16 with the throttle 15 is represented diagrammatically by shaft 17.

The torque motor is provided with a field winding 18 connected with the constant voltage source 7 in a circuit which includes a rheostat 19 also coupled with the shaft 14; said circuit preferably includes also a further secondary variator winding 20 on the metadyne exciter 5. The field winding 18 thus produces for any given opening of the throttle 12 and consequent setting of the rheostat 19 a constant excitation component cooperating with the armature 16 to produce a torque directed to open the throttle 15. The arrangement of the rheostat 19 is such that said torque component is increased as the throttle 12 is opened. The torque motor is provided with a second field winding 21 connected across a shunt or other resistive part 26 such as an interpole winding of said primary circuit. The field winding 21 acts in opposition to the winding 18 thereby tending to close the throttle 15. Since the primary current of the generator is representative of the secondary voltage of said generator, the winding 21 of the torque motor produces on the latter the component of excitation hereinbefore referred to dependent on the secondary voltage of the main generator.

A third field winding 22 of the torque motor is connected across a shunt 23 or other resistive part such as an interpole winding in the secondary circuit of the metadyne 1 and the traction motors so as to produce on the torque motor a component of excitation proportional to the metadyne output current. The winding 22 also is connected in the direction to tend to close the throttle 15.

In the operation of the arrangement shown in Figure 1, the regulator dynamo 9 is effective to produce a constant speed of the engine and main generator so that for a given throttle opening the power output of the engine will be maintained constant. This operation is represented in Figure 2 for one given position of the shaft 14 by the hyperbola *abcde* showing the current-voltage characteristic. Over the major part of the speed range of the traction motors, the sum of the excitation components produced on the torque motor by the windings 21 and 22 will be less than that produced by the winding 18 so that the throttle 15 will be maintained in the fully open position. Considering now reduction of speed of the traction motors to a low value and corresponding reduction of the voltage thereof, the output current would, if constant power were maintained, be raised to undersirable high values as shown by the broken line portion *a—b* of the curve in Figure 2. In the arrangement according to the invention, however, the field winding 22 of the torque motor will produce a correspondingly increased component of excitation such that the resultant excitation of the torque motor will first be reduced to zero and then, with further increase of secondary current, said winding 22 will produce a sufficient excitation in opposition to the winding 18 progressively to close the throttle so that the torque of the engine is reduced and the output current of the generator 1 limited, the characteristic therefore following the curve *b—f* instead of *b—a*. On the other hand, when the speed of the traction motors rises above a predetermined value, the increase of armature voltage of said motors will result in the excitation component due to the field winding 21 of the torque motor, again in conjunction with the component dependent on the metadyne output current, namely due to the winding 22 balancing, and with further increase of voltage overcoming, the excitation produced by the winding 18 so as to close the throttle 15 and thereby limit the output voltage. This operation is shown by the curve *d—g* in Figure 2, the voltage being limited instead of following the part *d—e* of the hyperbola with reduction of motor current.

The throttle 15 may be biased to the open position by a spring 24 so that the limitation of generator current is dependent upon the torque components due to windings 21 and 22 overcoming both the torque component due to the winding 18 and also the force of the spring 24.

The rheostat 19, connected in circuit with the field winding 18 of the torque motor, operates so that the values of secondary current and voltage of the main generator at which the opening of the throttle is reduced, will be varied simultaneously and in the same sense as the variation of speed and torque of the engine so that as is shown in Figure 2 a family of similar current-voltage characteristics of the traction motors is obtained for different positions of the shaft 14, the limiting values of motor current and voltage increasing progressively with the increase of power over the constant power range of said characteristics.

The inclusion in circuit with the rheostat 19 of the variator winding 20 of the metadyne exciter reduces the number of ampere turns which must be provided on the exciter 5 by the regulator dynamo 9. For this purpose the winding 20 is arranged to act in the direction to produce through the exciter 5 a flow of larger main metadyne secondary current. The winding 20 therefore determines a basic value of secondary current of the main metadyne 1 and the arrangement as a whole will be such that the secondary current of the machine 1, due to the winding 20, will tend to fall with increase of motor armature voltage, that is to say as the power output of the engine is increased by movement of the shaft 14 calling for higher output currents and voltages of the main metadyne, the current in the winding 20 is simultaneously increased to produce part of the required increase in ampere turns of the variator winding 4 of the main metadyne.

It will be understood that at the upper end of the traction motor speed range the current in the field winding 21 of the torque motor increases rapidly with further increase of motor speed, since the magnetic saturation in the main metadyne machine then causes the primary current of the latter to increase rapidly with increase in the secondary voltage, so that the maximum output voltage of the generator may be limited to a value only slightly greater than that at which the departure from the constant power characteristic is commenced, this being indicated at *d—g* in Figure 2.

Figure 3 shows a modification of the tachometer generator in which said generator is of the series kind. In this arrangement, the variator winding 6 of the metadyne exciter may be connected directly in series with the regulator dynamo, through the rheostat 11, instead of being energised in accordance with the difference between the voltages of the regulator dynamo and the constant voltage source. With the modification shown in Figure 3, the speed of the engine is again controllable by the setting of the rheostat 11 and the dynamo 9 is again critically excited.

In the form of torque motor described with reference to Figure 1, namely in which tappings of the armature winding are connected with the supply source 7, the torque produced on the shaft 17 by the torque motor will vary with the angular position of the armature 16. Where the tappings of the armature 16 are, in the maximum power position of the throttle 15, disposed on an axis perpendicular to the field axis of the torque motor, then the torque produced by the torque motor falls with the displacement of the throttle 15 and the result may be in some cases that the limitation of motor current with fall of voltage as shown by b—f in Figure 2, may be less pronounced than desired. The slope of said portion of the current-voltage characteristic may, however, be adjusted by appropriate angular relation between the tappings of the armature winding 16 and the maximum input position of the shaft 17.

Figure 4 illustrates a modification of the torque motor in which the armature 16 is provided with a direct current winding and a commutator connected to the source 7 through a pair of brushes and a ballast resistance 25. With this arrangement the torque will be constant irrespectively of the position of the shaft 17, and further, the end portion of the curve in Figure 2 now follows the line b—h, providing a still sharper limitation of current. In general the arrangement of Figure 4 will be preferred particularly in that it possesses the further advantage that any desired mechanical advantage may be provided between the armature 16 and the throttle 15 or equivalent engine control member, and the response will be less affected by variation in stiffness of the throttle linkage or equivalent engine control gear. For example the shaft 17 may be coupled with the throttle 15 or the like through a worm and worm gear 52 or screw and nut gear. In such cases the biasing spring 24 is omitted.

It will be understood that the arrangements of Figures 3 and 4 are applicable also in the system of Figures 5 and 6.

Figure 5 illustrates a system which is generally similar to that of Figure 1 but employing for the main generator a dynamo 1' of the ordinary form in place of the metadyne generator 1 of Figure 1, the switch 68 being brought to its vertical position. In Figure 5 the exciter 5 is then provided with a further variator winding 36 connected to receive a current proportional to the armature current of the main generator 1'. For example as illustrated in Figure 5 said winding 36 may be connected in series with the winding 22 of the torque motor across the shunt 23. The field winding 21 of the torque motor is now connected in the closed circuit between the primary brushes of the metadyne exciter 5; the primary voltage of the metadyne exciter is proportional to the secondary current of said exciter and therefore to the excitation of the main generator 1' so that current supplied to the winding 21 of the torque motor is again representative of the output voltage of the generator 1'.

The winding 36 acts in opposition to the winding 6 (and winding 29 if provided) to provide a current feedback from the main generator determining the excitation of said generator and therefore controlling the main generator current in accordance with the ampere turns of winding 6 or the algebraic sum of the ampere turns of windings 6 and 29. The operation of the arrangement of Figure 5 will therefore be substantially the same as that of Figure 1 in that the regulator dynamo 9 operates to maintain a set value of the main generator current at the value set by regulator dynamo 9 acting on winding 6 of the exciter 5. Figure 5 also illustrates diagrammatically a modification of the energy input control to the engine in that the shaft 17, instead of reducing the energy input to the engine when displaced by the torque motor 16 by effecting closure or partial closure of a second throttle, is connected together with the shaft 14 through a differential mechanism an output element of which is coupled with the main energy input control member. In Figure 5, a member controlling the energy input to the engine is illustrated at 31 and has pivotally mounted on the free end thereof a floating lever 32, one end of which is connected by a rack and and pinion at 33 with the shaft 14 and the other end of which is connected by a screw and nut gear 34 with the shaft 17.

Movement of the shaft 14 to increase the power output of the engine will move the upper end of the floating lever 32 to the right hand in Figure 5, whereas the rotation of the shaft 17 in response to the windings 21 and 23 predominating over the winding 18 will, through a screw and nut gear, actuate the lower end of the floating lever 32 to the left hand in the drawing so as to obtain the same result as with the two throttle 12 and 15 of Figure 1. The member 31 may be coupled with a throttle, injection pump control member or other means determining the energy input to the engine.

Referring now to Figure 6, in which is illustrated a preferred embodiment of the invention generally in accordance with the arrangement shown in Figure 1, there is mounted on the same shaft as the main generator 1 and the regulator dynamo 9 an auxiliary generator 37, which is conveniently provided with a shunt field winding 40 and voltage regulator 39 so as to maintain constant the output voltage of said auxiliary generator. The auxiliary generator is adapted to supply a constant voltage auxiliary supply for lighting and heating and other services as represented diagrammatically by a lighting load. The generator 37 may be employed also to charge a storage battery 7. The generator 37, in addition, constitutes the constant voltage source for controlling the metadyne excitation and torque motor.

The auxiliary generator is arranged also to supply an auxiliary machine set comprising a motor 38 and three exciters 5, 34, and 35 which are preferably of the metadyne form as illustrated, having short-circuited primary brushes.

The metadyne exciters 5 and 34 have their secondary brushes connected with stator windings of the main metadyne generator 1 so as respectively to control the variator excitation on the primary and secondary axes of said main generator. The exciters may for this purpose be connected with independent stator windings of the main generator or, as is illustrated in Figure 6, the main generator may for each cycle thereof be provided with four windings 27, 28, 29 and 30 carried respectively on the four polar projections under which lie the armature segments d—a, a—b, b—c, c—d of the main metadyne 1 and these windings are connected in a closed circuit in the form of a Wheatstone bridge. The secondary brushes of the exciter 5 are connected across the horizontal diagonal of the bridge, whilst the secondary brushes of the exciter 34 are connected across the vertical diagonal of the bridge. With this arrangement the current supplied to the metadyne stator windings by the exciter 5 will produce a resultant excitation acting on the secondary axis of the main metadyne, whilst the exciter 34 will produce a resultant excitation acting along the primary axis of the main metadyne.

The exciters 5 and 34 have field windings 20 and 53 which correspond with the winding 20 of Figure 1 and are connected, in series with the rheostat 19 and the field winding 18 of the dynamo 16, across the constant voltage source 7 and 37. Said exciters are also provided with field windings 6 and 42 connected in series with one another and the regulator dynamo 9 so that the windings 6 and 42 correspond with the winding 6 of Figure 1.

The secondary brushes of the exciter 35 are connected with field windings 48 and 49 of the traction motors 2 and 3. Said exciter is provided with a secondary variator winding 43 connected through a reversing switch 47 in a circuit which comprises the shunt 23 and the winding 22 of the torque motor. By this means the excitation of the motors 2 and 3 is of a series kind provided by the dependence of the secondary current of exciter 35 on the armature current of the motors. As in Figure 1, the field winding 21 of the dynamo 16 is connected to receive a current proportional to the primary current of the main metadyne generator 1.

The reversing switch 47 serves to determine the direction of motion of the equipment since it controls the direction of current in the motor field windings 48 and 49, the double switch 60, 66 being brought to its horizontal position.

As will hereinafter be described, the function of the exciter 35 is to control the operation of the motors 2 and 3.

Switches 44 and 45 are provided for short-circuiting the variator windings 6 and 42 of the exciters 5 and 24, whilst a switch 46 is provided for short-circuiting the winding 53 of the exciter 34. The equipment is provided with a controller including an operating lever as indicated by Figure 8 whereby for motoring conditions the switches 45 and 46 are closed and switch 44 opened, whilst for obtaining rheostat braking of the traction motors, switch 44 is closed and switches 45 and 46 opened. In order to provide a resistive load for the motors 2 and 3 during regenerative operation, a resistor 50 is connected in the primary circuit of the main metadyne 1 having connected thereacross a switch 51 which is closed when motoring but opened when said operating lever is moved to the braking position.

The torque motor 16 is preferably of the kind shown in Figure 4, and is shown as connected with the throttle 15 through a worm and worm wheel 52.

During motoring operation, therefore, the exciter 34 provides zero secondary current so that the main generator 1 is controlled entirely by the exciter 5 and since the windings 20 and 6 of said exciter are energized as described with reference to Figure 1, the exciter 5, producing secondary variator excitation of the generator 1, will provide in conjunction with the regulator dynamo 9, control of the motoring characteristics as described with reference to Figures 1 and 2. Preferably the exciter 35 is designed so that magnetic saturation therein will be reached for a value of the motor field current, that is to say the secondary current of exciter 35, smaller than corresponds with the maximum armature current of the motors, this value being chosen to correspond with that at which saturation of the magnetic circuit of the main motors appears and beyond which it is not economical to increase the field current of the main motors since such increase of field current will produce only relatively small increase in field strength and torque of said motors.

In order to obtain rheostatic braking, the reversing switch 47 is operated so as to reverse the motor back electromotive force, and the switch 51 is operated to insert the resistance 50 in circuit with the brushes $a$ and $c$ of the metadyne. The switch 44 is closed, to short-circuit winding 6 of the exciter 5, so that the latter provides excitation on the axis $b$—$d$ of the metadyne 1 controlled entirely by the rheostat 19. The secondary current of the metadyne 1 and thereby the motor armature current and braking torque are regulable by the rheostat 19. The switches 45 and 46 are opened so that the excitation produced during motoring on the exciter 5 is now transferred to the exciter 34. The main metadyne 1 now operates as a transformer converting the variable voltage energy produced by the motors 2 and 3 partly into current supplied to the resistor 50, and partly into mechanical energy which serves to keep the main metadyne 1 and engine in rotation at the desired speed determined by the setting of the rheostat 11 in circuit with the field of the regulator dynamo 9. The arrangement therefore operates to maintain substantially constant or slightly increasing braking torque with fall of speed of the traction motors, as is generally desired.

It will be understood that the several modifications described with reference to Figures 1, 3, 4 and 5 are applicable in the system of Figure 6.

The variator winding 43 of the metadyne exciter 35 may be fed by a constant current during the braking period, the value of said current being controlled by the operator directly. Figure 6 shows a battery 61 energizing said winding 43 when the double switch 60, 66 is brought at its vertical position; the control of the current traversing the winding 43 is obtained by means of the rheostat 62.

A resistor may be also inserted in the main circuit of the dynamo 1' of the scheme of Figure 5 during the braking period, the said resistor dissipating the recuperated power.

The primary brushes of the main metadyne generator may be connected to an auxiliary source at a substantially constant voltage instead of being short circuited when the motors require power. Thus a battery 63 may be connected to brushes $a$ and $c$ of the metadyne 1 of Figure 1 by opening switch 64 and closing switch 65.

Many other changes may be brought remaining within the field of the present application; for instance one may adopt any other arrangement of the metadyne exciters and the stator windings of the main generator 1, provided the same resultant ampere turns are obtained on the stator.

Thus Figure 7 illustrates a modification of the circuits comprising the exciters 5 and 34 and stator windings of the main metadyne generator. In this modification, the main metadyne generator 1 is provided with stator windings 54 and 55 located on adjacent poles of the metadyne and connected with the exciters separately.

I claim:

1. In an electrical power transmission system comprising an engine the output of which is regulated by throttles, the said engine being mechanically coupled with an electric main generator supplying power to motors, the said engine being further coupled with a device, hereinafter referred to as regulator device, very sensitive to the speed variations and able to yield a relatively large electric current, called regulator current, for relatively small departures of the speed from an arbitrarily determined normal speed, the said regulator current adjusting automatically the current and voltage output of the main electric generator to the motors so as to maintain constant the speed of the engine whatever may be the voltage required by the motors, means, hereinafter referred to as setting device, responsive to the output current and to the output voltage of the main electric generator for controlling the action of one of said throttles and reducing the power output of the engine when the output current or output voltage of the main electric generator exceed a predetermined safe value; means for dissipating the recuperated electric power into a resistor connected to the said main generator when the motors are braking, the regulator current being then used for obtaining the right voltage across the dissipating resistor whatever may be the voltage induced by the motors.

2. In an electrical power transmission as described in claim 1, the means described in the same claim, the regulator device being a shunt dynamo critically excited for the arbitrarily defined normal speed by setting a rheostat inserted in the circuit of its shunt excitation.

3. In an electrical power transmission as described in claim 1, the means described in the same claim, the regulator device being a series dynamo critically excited for the arbitrarily defined normal speed by setting a rheostat inserted in the circuit of the said series dynamo.

4. In an electrical power transmission as described in claim 1 the means described in the same claim, the main electric generator being excited by metadyne exciters the secondary current of which is controlled by the regulator current and by an auxiliary current arbitrarily determined for each value of the maximum desired output of the engine.

5. In an electrical power transmission as described in claim 1 the means described in the same claim the main electric generator being a dynamo excited by a metadyne exciter upon which acts the regulator current dynamo and the output current of the said dynamo as feedback component.

6. In an electrical power transmission as described in claim 1 the means described in the same claim the main electric generator being a dynamo excited by a metadyne exciter upon which acts the regulator current dynamo and the output current of the said dynamo as feedback component, the setting device being a torque motor of the moving armature type the armature being fed with some practically constant current and the field being excited by three coils, a first coil creating some constant adjustable ampere-turns, a second coil creating ampere-turns representative of the current supplied by the main generator to the motors and a third coil representative of the voltage supplied by the main generator to the motors, the ampere turns of the first coil being opposed to the ampere turns of the other two coils.

7. In an electrical power transmission as described in claim 1 the means described in the same claim the main electric generator being a dynamo excited by a metadyne exciter upon which acts the regulator current dynamo and the output current of the said dynamo as feedback component, the setting device being a torque motor of the moving armature type the armature being fed with some practically constant current and the field being excited by three coils, a first coil creating some constant adjustable ampere turns, a second coil creating ampere turns representative of the current supplied by the main generator to the motors and a third coil representative of the voltage supplied by the main generator to the motors, by being fed by the primary current of the exciter metadyne feeding the field of the main generator, the ampere turns of the first coil being opposed to the ampere turns of the other two coils.

8. In an electrical power transmission as described in claim 1 the means described in the same claim the main electric generator being a dynamo excited by a metadyne exciter upon which acts the regulator current dynamo and the output current of the said dynamo as feedback component, the setting device being a dynamo the armature of which is fed by a current of a practically constant intensity and the field of which is excited by three coils, a first coil creating some constant adjustable ampere turns, a second coil creating ampere turns representative of the current supplied by the main generator to the motors and a third coil representative of the voltage supplied by the main generator to the motors, the ampere turns of the first coil being opposed to the ampere turns of the other two coils.

9. In an electrical power transmission as described in claim 1 the means described in the same claim the main electric generator being a dynamo excited by a metadyne exciter upon which acts the regulator current dynamo and the output current of the said dynamo as feedback component, the setting device being a dynamo the armature of which is fed by a current of a practically constant intensity and the field of which is excited by three coils, a first coil creating some constant adjustable ampere turns, a second coil creating ampere turns representative of the current supplied by the main generator to the motors and a third coil representative of the voltage supplied by the main generator to the motors, by being fed by the primary current of the exciter metadyne feeding the field of the main generator, the ampere turns of the first coil being opposed to the ampere turns of the other two coils.

10. In an electrical power transmission system comprising an engine the output of which is regulated by throttles the said engine being mechanically coupled with an electric main generator of the metadyne type having a set of primary and a set of secondary brushes supplying power to the motors by its secondary brushes, further coupled with a device hereinafter referred to as regulator device, very sensitive to the speed variations and able to yield a relatively large electric current, called regulator current, for relatively small departures of the speed from an arbitrarily determined normal speed, the said regulator current adjusting automatically the current and voltage output of the main metadyne generator to the motors so as to maintain constant the speed of the engine whatever may be the voltage required by the motors, means, hereinafter referred to as setting device, responsive to the output current and to output voltage of the main metadyne generator for controlling the action of one of said throttles and reducing the power output of the engine when the secondary current or the secondary voltage of the main generator metadyne exceed a predetermined safe value; means for dissipating the recuperated power into a resistor connected between the primary brushes of the main metadyne generator when the motors are braking the regulator current being then used for controlling the voltage induced between the primary brushes of the main metadyne so that the resistor connected across said primary brushes dissipates the regenerated electric power whatever may be the voltage induced by the motors; the said main metadyne having its stator windings preferably fed by exciter metadynes.

11. In an electrical system as indicated in claim 10, the means indicated in the same claim the setting device being a torque motor of the moving armature type the armature being fed with some practically constant current and the field being excited by three coils, a first coil creating some constant adjustable ampere turns, a second coil creating ampere turns representative of the secondary current supplied by the main metadyne, and a third coil representative of the secondary voltage supplied by the main metadyne, the ampere turns of the first coil being opposed to the ampere turns of the other two coils.

12. In an electrical system as indicated in claim 10, the means indicated in the same claim the setting device being a torque motor of the moving armature type the armature being fed with some practically constant current and the field being excited by three coils, a first coil creating some constant adjustable ampere turns, a second coil creating ampere turns proportional to the secondary current supplied by the main metadyne, and a third coil creating ampere turns proportional to the primary current of the main metadyne, the ampere turns of the first coil being opposed to the ampere turns of the other two coils.

13. In an electrical power transmission as indicated in claim 1, the means indicated in the said claim and further means for controlling arbitrarily one of the throttles by a handle, at disposal of the operator, handle which regulates simultaneously the current in a coil controlling the secondary current of the exciter metadyne controlling the output current of the main generator, and which regulates simultaneously the current in the element of the setting device determining the limit of the safe output current and of the safe output voltage not to be exceeded and which finally regulates simultaneously the resistance determining the value of the normal speed of the regulator device the said simultaneous regulation allowing for higher normal speed for higher output current and output voltage limits when the opening of the throttle increases allowing for higher power of the engine.

14. In an electrical system as indicated in claim 10, the means indicated in the same claim the setting device being a dynamo the armature being fed with some practically constant current and the field being excited by three coils, a first coil creating some constant adjustable ampere turns, a second coil creating ampere turns representative of the secondary current supplied by the main metadyne, and a third coil representative of the secondary voltage supplied by the main metadyne, the ampere turns of the first coil being opposed to the ampere turns of the other two coils.

15. In an electrical system as indicated in claim 10, the means indicated in the same claim the setting device being a dynamo the armature being fed with some practically constant current and the field being excited by three coils, a first coil creating some constant adjustable ampere turns, a second coil creating ampere turns proportional to the secondary current supplied by the main metadyne, and a third coil creating ampere turns proportional to the primary current of the main metadyne, the ampere turns of the first coil being opposed to the ampere turns of the other two coils.

16. In an electric power transmission system comprising an engine, throttle means for regulating the output of said engine, said engine being mechanically coupled with an electric main generator supplying power to motors, said engine being further coupled with speed regulator means sensitive to the speed variations of the engine and adapted to supply a relatively large electric regulator current for relatively small deviations from an arbitrarily determined speed, said regulator current being adapted to automatically adjust the current and voltage output of the main electric generator in accordance with the voltage requirements of the motors, setting means automatically responsive to the output current and output voltage of the main electric generator for controlling the position of said throttle means, further setting means manually controlled, for further controlling the position of said throttle, means for operatively interconnecting said first and second mentioned setting means whereby said throttle takes a position result of the differential displacements caused by the operation of said first and second setting means.

17. In an electric power transmission as in claim 1, means for delivering excitation current to the motors comprising a field exciter means, means for controlling the field excitation of said exciter means by the armature current of said motors, means for creating a strong iron saturation of said exciter means when the armature current of said motors exceeds a given value, whereby the excitation current of said motors increases less than proportional to the armature current of said motors.

18. In an electric power transmission as in claim 1, means for delivering excitation current to the motors comprising an exciter metadyne, means for controlling the output current of said exciter metadyne comprising a stator winding of said exciter metadyne traversed by a current proportional to the armature current of said motors, means for creating a strong iron saturation of said exciter means when the armature current of said motors exceeds a given value, whereby the excitation current of said motors increases less than proportional to the armature current of said motors.

JOSEPH MAXIMUS PESTARINI.

REFERENCES CITED

The following references are of record in the file of this patent:

UNITED STATES PATENTS

| Number | Name | Date |
|---|---|---|
| 2,038,384 | Pestarini | Apr. 21, 1936 |
| 2,049,388 | Pestarini | July 28, 1936 |
| 2,203,544 | Pestarini | July 13, 1943 |
| 2,324,293 | Edwards | July 13, 1943 |
| 2,393,618 | Edwards et al. | Jan. 29, 1946 |
| 2,393,620 | Adams et al. | Jan. 29, 1946 |
| 2,393,621 | Adams | Jan. 29, 1946 |
| 2,448,813 | Lewis | Sept. 7, 1948 |